United States Patent
Bjorge et al.

(10) Patent No.: US 7,055,617 B2
(45) Date of Patent: Jun. 6, 2006

(54) SOIL AERATOR

(75) Inventors: Scott W. Bjorge, Owatonna, MN (US); David R. Maas, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 102 days.

(21) Appl. No.: 10/638,953

(22) Filed: Aug. 11, 2003

(65) Prior Publication Data

US 2005/0034878 A1 Feb. 17, 2005

(51) Int. Cl.
*A01B 45/02* (2006.01)

(52) U.S. Cl. ............... 172/22; 172/123; 172/125

(58) Field of Classification Search ........... 172/21, 172/22, 42, 48, 79, 35, 118, 121, 122, 123, 172/125

See application file for complete search history.

(56) References Cited

U.S. PATENT DOCUMENTS

| | | | |
|---|---|---|---|
| 1,704,986 A * | 3/1929 | Marcy | 172/21 |
| 1,965,510 A * | 7/1934 | Porter | 172/21 |
| 2,347,748 A | 5/1944 | Melling | |
| 2,591,572 A | 4/1952 | Mascaro | |
| 2,778,291 A | 1/1957 | Kerns | |
| 3,143,090 A * | 8/1964 | Cecil et al. | 111/118 |
| 3,148,737 A * | 9/1964 | Lunsford | 172/21 |
| 3,393,751 A | 7/1968 | Mascaro | |
| 3,522,965 A | 8/1970 | Indzeoski | |
| 3,534,818 A | 10/1970 | Mascaro | |
| 3,707,132 A | 12/1972 | Hansen | |
| 3,797,577 A | 3/1974 | Killion et al. | |
| 3,877,401 A | 4/1975 | Gutman | |
| 3,939,917 A | 2/1976 | Reed, Jr. et al. | |
| 3,993,143 A | 11/1976 | Moreland, Jr. | |
| 4,020,907 A | 5/1977 | Luck | |
| 4,081,034 A | 3/1978 | Hines | |
| 4,148,362 A | 4/1979 | Orth | |
| 4,158,391 A | 6/1979 | Clements | |
| 4,192,387 A | 3/1980 | Stinson | |
| 4,212,357 A | 7/1980 | Clements et al. | |
| RE30,705 E | 8/1981 | Hines | |
| 4,326,591 A * | 4/1982 | Dedoes | 172/22 |
| 4,336,760 A | 6/1982 | Cohen et al. | |
| 4,383,580 A | 5/1983 | Huxford | |
| 4,489,787 A | 12/1984 | Gary | |
| 4,538,689 A | 9/1985 | Dietrich, Sr. | |
| 4,550,783 A | 11/1985 | Hansen | |
| 4,619,329 A | 10/1986 | Gorbett | |
| 4,632,189 A | 12/1986 | Rizzo | |
| 4,662,456 A | 5/1987 | Classen | |

(Continued)

OTHER PUBLICATIONS

PlanetAir Aerator, "Aerate, Mow, then Putt in just 15 minutes . . . ", Brochure, PlanetAir Turf Products, LLC — believed to have been publicly available before Aug. 11, 2003.

(Continued)

*Primary Examiner*—Victor Batson
(74) *Attorney, Agent, or Firm*—Fish & Richardson P.C., P.A.

(57) ABSTRACT

A soil aeration apparatus may include aeration tines that are actuated by a relatively compact gear system that reduces the size and weight of the apparatus. In addition, a soil aeration apparatus may operate without a centrally disposed support shaft, thus enabling the tine-holder shafts to be positioned closer to one another and reducing the size of the apparatus.

25 Claims, 7 Drawing Sheets

U.S. PATENT DOCUMENTS

| | | |
|---|---|---|
| 4,699,220 A | 10/1987 | Strohm |
| 4,723,607 A | 2/1988 | Hansen |
| 4,773,486 A | 9/1988 | Huber et al. |
| 4,776,404 A | 10/1988 | Rogers et al. |
| 4,840,232 A | 6/1989 | Mayer |
| 4,867,244 A | 9/1989 | Cozine et al. |
| 4,899,828 A | 2/1990 | Harris |
| 4,910,948 A | 3/1990 | Nelson |
| 5,014,791 A | 5/1991 | Kure |
| 5,020,602 A | 6/1991 | Dellinger |
| 5,029,652 A | 7/1991 | Whitfield |
| 5,101,910 A | 4/1992 | Dawson |
| 5,119,880 A | 6/1992 | Zehrung, Jr. et al. |
| 5,152,348 A | 10/1992 | Flanagan, Sr. et al. |
| 5,172,768 A | 12/1992 | Straus |
| 5,207,278 A | 5/1993 | Hatlen |
| 5,209,306 A | 5/1993 | Whitfield |
| 5,398,767 A | 3/1995 | Warke |
| 5,460,229 A | 10/1995 | Mattis |
| 5,469,922 A | 11/1995 | Bjorge |
| 5,570,746 A | 11/1996 | Jones et al. |
| 5,579,847 A | 12/1996 | Postema |
| 5,586,603 A | 12/1996 | Mattis |
| 5,586,604 A | 12/1996 | Postema |
| 5,623,996 A | 4/1997 | Postema |
| 5,662,172 A | 9/1997 | Brown |
| 5,673,756 A | 10/1997 | Classen |
| 5,680,903 A | 10/1997 | Oliver |
| 5,690,179 A | 11/1997 | Dickson |
| 5,709,272 A | 1/1998 | Jones et al. |
| 5,765,645 A | 6/1998 | Postema |
| 5,769,169 A | 6/1998 | Miksitz |
| 5,803,181 A * | 9/1998 | Hsu ............................ 172/21 |
| 5,806,293 A | 9/1998 | Klein et al. |
| 5,816,336 A | 10/1998 | Underhill |
| 5,823,269 A | 10/1998 | Leclerc |
| 5,868,206 A | 2/1999 | Miller |
| 5,906,090 A | 5/1999 | Knudsen |
| 5,934,055 A | 8/1999 | Steele |
| 6,003,612 A | 12/1999 | Knight et al. |
| 6,003,613 A | 12/1999 | Reincke |
| 6,038,989 A | 3/2000 | Comer et al. |
| 6,041,869 A | 3/2000 | Lewis et al. |
| 6,102,129 A | 8/2000 | Classen |
| 6,179,061 B1 | 1/2001 | Fiore |
| 6,241,025 B1 | 6/2001 | Myers et al. |
| 6,273,197 B1 | 8/2001 | Marlow |
| 6,484,811 B1 * | 11/2002 | Edwards ...................... 172/21 |
| 6,513,603 B1 * | 2/2003 | Bjorge ......................... 172/22 |
| 6,691,791 B1 | 2/2004 | Bjorge |
| 2003/0230417 A1 | 12/2003 | Maas |

OTHER PUBLICATIONS

PlanetAir Aerator, "Innovation that improves and protects your piece of the planet . . . ," Brochure, PlanetAir Turf Products, LLC —believed to have been publicly available before Aug. 11, 2003.

PlanetAir Aerator, "Aerate. Mow. Play.", Brochure, PlanetAir Turf Products, LLC —believed to have been publicly available before Aug. 11, 2003.

\* cited by examiner

SOIL AERATOR

BACKGROUND

Soil aeration is a conventional technique used by groundskeepers to reduce compaction in the ground soil, stimulate plant growth, and promote proper drainage. Soils may become compacted from overuse or environmental effects, which ultimately affects the soil permeability and development of rooted plants within the soil. In particular, compacted soil restricts the amount of oxygen that can enter the soil and the amount of carbon dioxide that can escape. Not all grounds are affected equally by overuse and environmental factors. The amount of compaction depends soil texture, the amount of vegetation, and the moisture content of the soil. Periodic soil aeration relieves the compaction in the soil before the negative effects overburden the soil to the point that it can no longer support desirable vegetation.

In general, soil aerators have aeration tubes that penetrate the ground and remove "plugs" of soil. The aeration tubes are typically carried on bars or racks that are affixed to a rotary member. The rotor, racks, and associated gear hardware are typically large, bulky, and heavy. The overall dimensions and weight of the aeration device are accordingly increased. That, in turn, necessitates the use of relatively large tractors with large displacement engines. Consequently, most aeration devices are expensive to operate and ill-suited for residential, light commercial, or rental use.

SUMMARY

A soil aeration apparatus may include aeration tines that are actuated by a relatively compact gear system, which reduces the size and weight of the aeration apparatus. In an illustrative embodiment, a soil aeration apparatus includes at least two tine-holder shafts rotatably mounted to a carrier and aeration tines attached to each shaft. The apparatus may also include a gear system for rotating the tine-holder shafts while the tine-holder shafts revolve about a central axis of the carrier. The gear system may have a planetary gear coupled to each tine-holder shaft and a sun gear axially aligned with the central axis such that each sun gear engages a plurality of planetary gears.

In various embodiments, a soil aeration apparatus may operate without a centrally disposed support shaft, thus enabling the tine-holder shafts to be positioned closer to one another and reducing the size of the apparatus. In one illustrative embodiment, a soil aeration apparatus may include a carrier rotatably attached to a frame such that the carrier is rotatable about a central axis. The apparatus may also include first and second two tine-holder shafts rotatably mounted to the carrier and aeration tines attached to each shaft. A non-centrally located support shaft may be coupled to the carrier and offset from the central axis and mounted to the carrier. The first and second shafts may be offset from the central axis such that the tines are operative to move through the central axis without interference from another tine or shaft.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
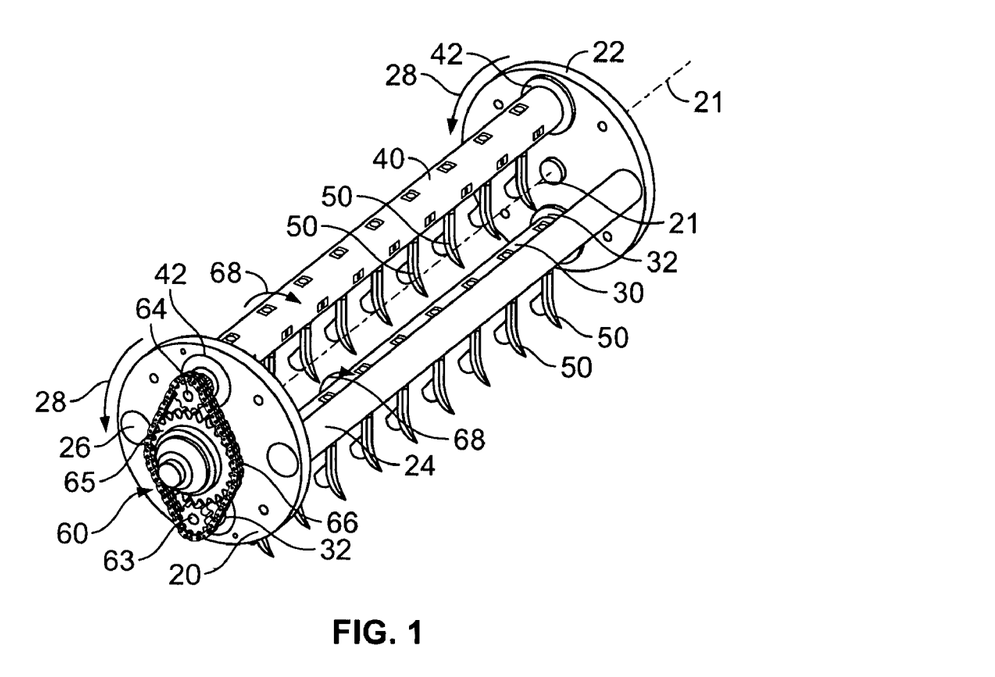
FIG. 1 is a perspective view of a soil aeration apparatus in accordance with an embodiment of the invention.

Referring to FIG. 1, a soil aeration apparatus 10 includes two tine-holder shafts 30 and 40 extending between opposing carriers 20 and 22. The shafts 30 and 40 are rotatably mounted to the carriers 20 and 22 such that each shaft may rotate 68 about its own axis. The shafts 30 and 40 are positioned substantially parallel in the axial direction, and soil aeration tines 50 extend from each shaft 30 and 40 in the radial direction. The soil aeration tines 50 may penetrate and remove a portion of soil from a ground surface as is taught, for example, in U.S. Pat. No. 6,513,603 issued to Bjorge on Feb. 4, 2003, the contents of which are herein incorporation by reference. Two non-centrally located support shafts 24 and 26 also extend between the opposing carriers 20 and 22. The support shafts 24 and 26 are fixedly mounted to the carriers 20 and 22 and provide mechanical support for the soil aeration apparatus 10 when in operation. A gear system 60 is engaged with the tine-holder shafts 30 and 40 to cause rotation of the tine-holder shafts 30 and 40. The gear system 60 has a plurality of planetary gears 63 and 64 for each sun gear 65. Each shaft 30 or 40 has a planetary gear 63 or 64 attached thereto. In this embodiment, the sun gear 65 is positioned between the planetary gears 63 and 64 and is engaged with the planetary gears 63 and 64 using a drive chain 66. Because a plurality of planetary gears 63 and 64 are operated using an individual sun gear 65, the bulkiness of the gear system 60 is advantageously reduced. Furthermore, because the apparatus 10 does not use a centrally located support shaft, the tine-holder shafts 30 and 40 may be positioned closer to one another, thus reducing the overall size of the apparatus 10.

Referring to FIG. 1 in more detail, bearings 32 and 42 may be used to rotatably mount the shafts 30 and 40, respectively, to the carriers 20 and 22. The bearings 32 and 42 may comprise ball bearings, roller bearings, or bushings, and may provide access for a portion of the shafts 30 and 40 to extend through the carriers 20 and 22. The planetary gear 63 is axially aligned with the shaft 30 and fixedly mounted to the portion of the shaft 30 on the outer side of the carrier 20. Similarly, the planetary gear 64 is axially aligned with the shaft 40 and mounted to the portion of the shaft extending through the carrier 20. In this embodiment, the planetary gears 63 and 64 are radially aligned with the sun gear 65 such that a single drive chain 66 is engaged with all three gears 63, 64, and 65. Briefly describing the operation of the gear system 60, the carriers 20 and 22 are motivated to rotate about a central axis 21 using a drive means (not shown in FIG. 1). The sun gear 65 is axially aligned with the central axis 21 but remains substantially fixed with respect to the central axis as the carriers 20 and 22 rotate. When the carriers 20 and 22 rotate, the tine-holder shafts 30 and 40 are caused to revolve around the central axis 21. Likewise, the planetary gears 63 and 64 also revolve around the central axis 21. As such, the planetary gears 63 and 64 revolve about the sun gear 65 in a direction 28 as the drive chain 66 causes the planetary gears 63 and 64 to rotate in a direction 68. The motion of revolving 28 the shaft 30 or 40 about the central axis 21 while rotating 68 the shaft 30 or 40 about its own axis causes the desired motion of the tines 50 to penetrate and remove a portion of soil from the ground surface.

Still referring to FIG. 1, the support shafts 24 and 26 are positioned between the carriers 20 and 22 and fixedly mounted to near the perimeter of each carrier 20 and 22. Because the support shafts 24 and 26 are non-centrally located (e.g., offset from the central axis 21), tine-holder shafts 30 and 40 may be positioned closer to the central axis 21 without interference from the tines 50 hitting a centrally located shaft. Rather, the tine-holder shafts 30 and 40 may rotate in the direction 68 as the tines 50 pass through the central axis 21 without interference. The compact arrangement of shafts 30, 40, 24, and 26 advantageously reduces the overall size of the soil aeration apparatus 10 in comparison to other apparatus that require the tine-holder shafts 30 and 40 to be spaced apart for clearance between the revolving tines 50 and a centrally located support shaft.

Figure 2:
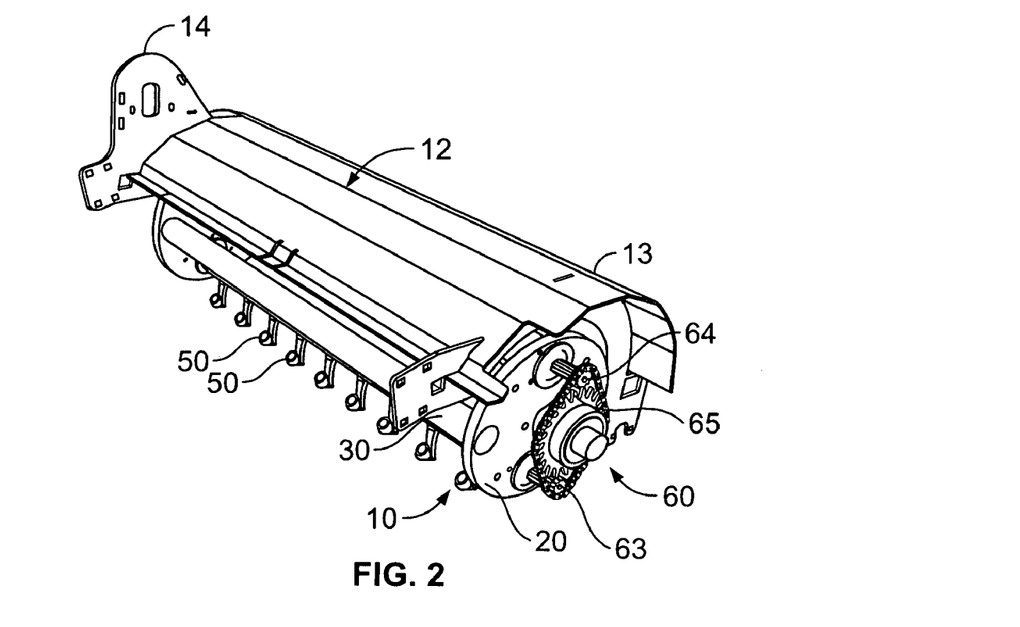
FIG. 2 is a perspective view of a frame for housing the soil aeration apparatus of FIG. 1, with certain components of the frame removed.

Referring to FIG. 2, the soil aeration apparatus 10 may be installed in a frame 12. The frame 12 may have a safety panel 13 to prevent damage to the tine-holder shafts 30 and 40 from debris and to protect a user from the moving tines 50 and tine-holder shafts 30 and 40. The frame 12 may also include side panels 14 to protect the gear system 60 from debris. In the embodiment shown in FIG. 2, one side panel 14 is removed to better show the soil aeration apparatus within the frame 12. Optionally, the sun gear 65 may be attached to the side panel 14 (removed from the view show in FIG. 2) to maintain the sun gear 65 in a substantially fixed relationship with respect to the central axis 21. The carriers 20 and 22 may be rotatably attached to the side panels 14 or other part of the frame 12 such that the carriers 20 and 22 may rotate about the central axis 21 while the frame 12 remains substantially fixed with respect to the central axis 21. A set of wheels (not shown in FIG. 2) may be connected to the side panels 14 or other part of the frame 12. Additionally, the frame may include other components that enable the frame 12 to be attached to a tractor or other vehicle.

Figure 3:
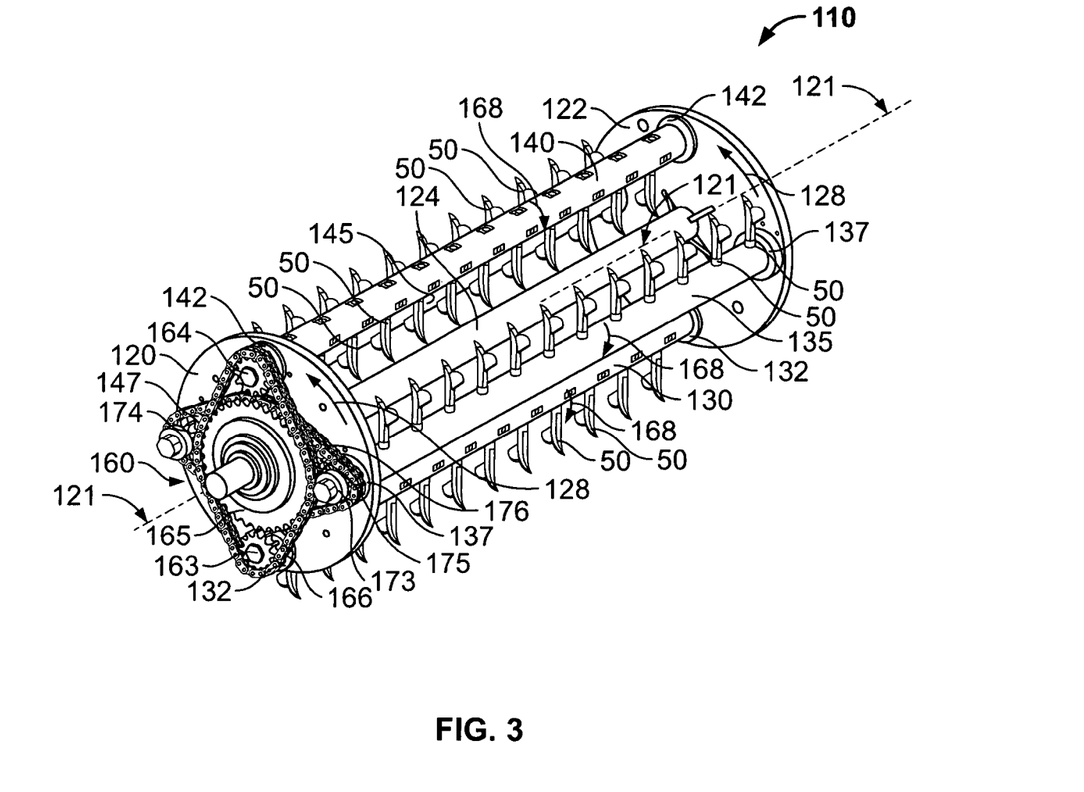
FIG. 3 is a perspective view of a soil aeration apparatus in accordance with another embodiment of the invention.

Referring to FIG. 3, another embodiment of a soil aeration apparatus 110 includes four tine-holder shafts 130, 135, 140, and 145 extending between two carriers 120 and 122. Soil aeration tines 50 extend in a substantially radial direction from each shaft 130, 135, 140, and 145 and are capable of penetrating and removing a portion of soil from the ground surface. The shafts 130, 135, 140, and 145 extend substantially parallel to one another in the axial direction between the carriers 120 and 122. The shafts 130, 135, 140, and 145 are rotatably mounted to the carriers 120 and 122 using bearings 132, 137, 142, and 147, respectively. As such, each tine-holder shaft 130, 135, 140, or 145 may rotate about its own axis in a direction 168 while all the shafts 130, 135, 140, and 145 revolve in a direction 128 around a central axis 121. The bearings 132, 137, 142, and 147 may comprise ball bearings, roller bearings, or bushings, and may provide access for a portion of the shafts 130, 135, 140, and 145 to extend through the carriers 120 and 122.

Figure 4:
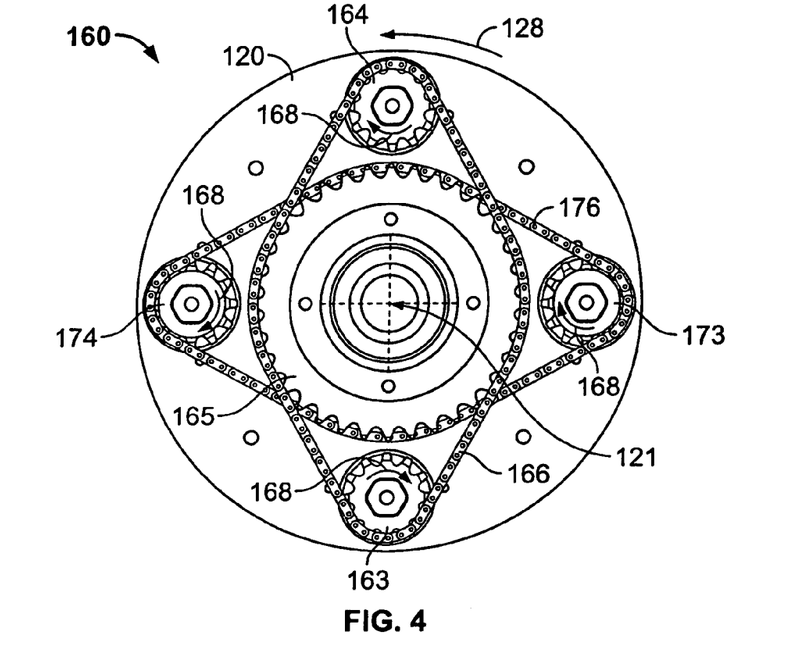
FIG. 4 is a side view of the soil aeration apparatus of FIG. 3.

Referring to FIGS. 3 and 4, the soil aeration apparatus 110 includes a gear system 160 having a plurality of planetary gears 163, 164 (or 173, 174) for each sun gear 165 (or 175). In this embodiment, planetary gears 163 and 164 interact with sun gear 165. Planetary gear 163 is axially aligned with and fixedly mounted to tine-holder shaft 130. Likewise, planetary gear 164 is axially aligned with and fixedly mounted to tine-holder shaft 140. The sun gear 165 is axially aligned with the central axis 121 but remains substantially fixed with respect to the central axis 121 as the carriers 120 and 122 rotate about the central axis 121. A drive chain 166 is engaged with the sun gear 165 and the corresponding planetary gears 163 and 164, which causes the planetary gears 163 and 164 to rotate in the direction 168 as the planetary gears 163 and 164 revolve about the sun gear 165 in the direction 128. This rotational 168 and revolving 128 motion of the planetary gears 163 and 164 causes the tine-holder shafts 130 and 140 to move in a desired path for penetrating and removing portions soil from the ground surface. Planetary gears 173 and 174 interact with sun gear 175 by way of a drive chain 176 in a manner similar to that of sun gear 165 and planetary gears 163 and 164. The interaction of planetary gears 173 and 174 with the sun gear 175 causes the tine-holder shafts 135 and 145 to have a rotational 168 and revolving 128 motion similar to that of tine-holder shafts 130 and 140. The gear system 160 provides the desired motion of the tine-holder shafts 130, 135, 140, and 145 without using individual sun gear and planetary gear for each tine-holder shaft (e.g., four tine-holder shafts, four sun gears, and four planetary gears). Rather, the gear system 160 operates a plurality of planetary gears from each sun gear, which advantageously reduces the bulkiness of the gear system of the soil aeration apparatus.

Figure 5:
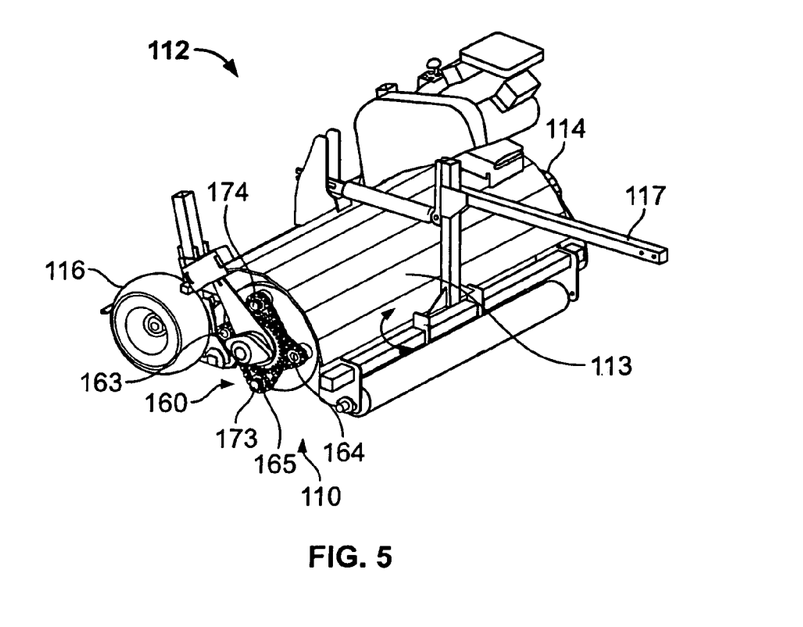
FIG. 5 is a perspective view of a frame for housing the soil aeration apparatus of FIG. 4, with a side panel removed from the frame.

Referring to FIG. 5, the soil aeration apparatus 110 may be installed in a frame 112 that transports the apparatus over a ground surface. The frame may include a safety panel 113 and side panels 114, as previously described in connection with FIG. 2. In this embodiment, a side panel 114 is removed to better show the soil aeration apparatus 110 housed in the frame 112. In addition, the frame may include wheels 116 and a connection means 117 so that the frame 112 may be attached to a tractor or other vehicle and moved over the ground surface.

Briefly referring again to FIG. 3, the soil aeration apparatus 110 may include a support shaft 124 along the central axis 121. This support shaft 124 provides mechanical stability for the soil aeration apparatus 110 when in operation. Optionally, the soil aeration apparatus 110 may operate without a centrally located support shaft 124. For example, the tine-holder shafts 130, 135, 140, and 145 may be rotatably mounted to the carriers 120 and 122 so as to provide sufficient mechanical stability for the soil aeration apparatus 110 without the need for the support shaft 124. In such a case, the tine-holder shafts 130, 135, 140, and 145 would also serve as non-centrally located support shafts.

Figure 6:
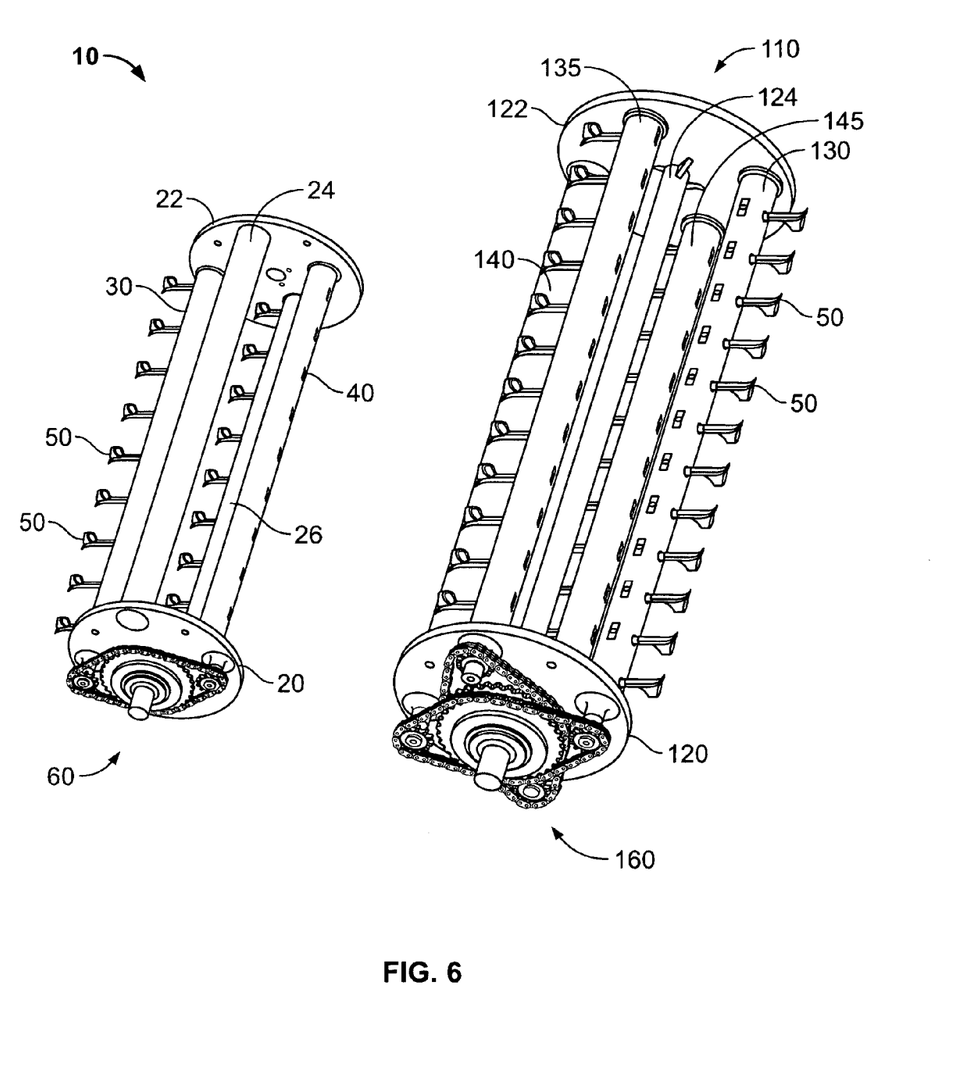
FIG. 6 is a perspective view of the soil aeration apparatus of FIG. 1 and the soil aeration apparatus of FIG. 3.

Referring now to FIG. 6, the size of the soil aeration apparatus may be advantageously reduced by eliminating the centrally located support shaft. The soil aeration apparatus 10 (also shown in FIG. 1) includes non-centrally located support shafts 24 and 26. As such, the tine-holder shafts 30 and 40 may be positioned closer to the central axis 21 without the need for clearance space for the tines 50. The tines 50 on one shaft 30 may be staggered from tines 50 on another shaft 40 such that the tines 50 may revolve about the tine-holder shaft 30 without interference from other tines 50. In certain embodiments, there may be a need for mechanical support from a centrally located support shaft 124. In such cases, the tine-holder shafts may be sufficiently spaced apart such that the tines 50 may revolve about one tine-holder shaft without interference from a centrally located support shaft or a neighboring tine-holder shaft. For example, the soil aeration apparatus 110 (also shown in FIG. 3) includes a centrally located support shaft 124 and tine-holder shafts 130, 135, 140, and 145 that are spaced apart to provide clearance for the tines 50. The size of the soil aeration apparatus 110 may be reduced, however, if the centrally located support shaft 124 is eliminated and the tine-holder shafts are positioned closer to one another.

In operation, the soil aeration apparatus 10 or 110 may be attached to a frame 12 or 112 that guides the apparatus 10 or 110 over a ground surface. In some embodiments, the frame may be attachable to a tractor or other vehicle such that the apparatus is towed behind the vehicle over a ground surface. In other embodiments, the frame is configured to be manually pushed by a user over the ground surface. A drive means, such as a spinning drive shaft that causes the carriers to rotate, may be attached to the frame 12 or 112 and the soil aeration apparatus 10 or 110 to produce the desired revolving and rotation motion of the planetary gears and the tine-holder shafts. Alternatively, the drive means may comprise the carrier 20 or 120 being forced to rotate as it rolls along the ground surface.

Figure 7A:
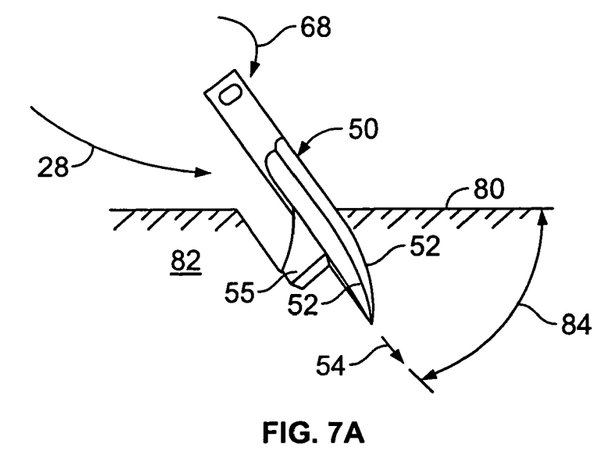
FIGS. 7A–C are side views of a soil aeration tine forming an aeration pocket in accordance with an embodiment of the invention.
Figure 7B:
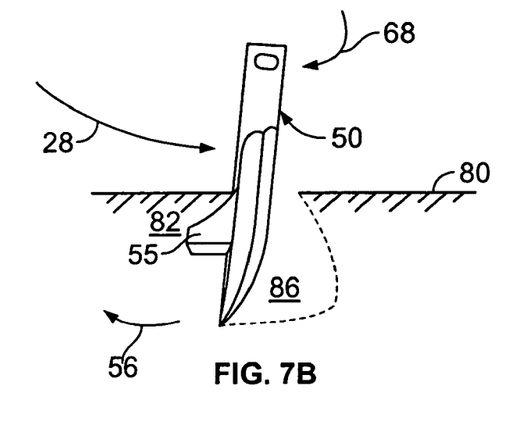
Figure 7C:
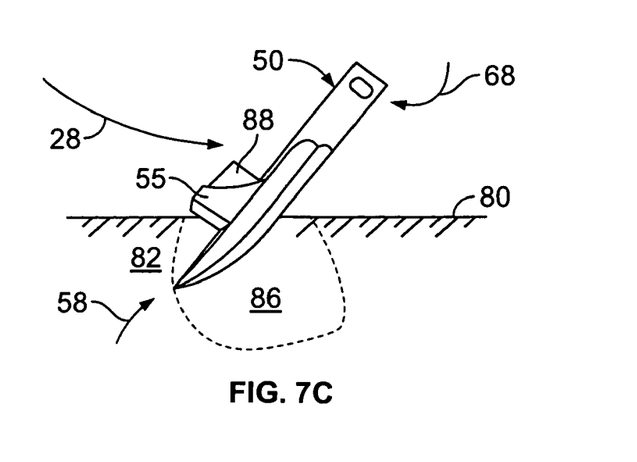

Referring to FIGS. 7A–C, the soil aeration tines 50 may operate to penetrate a ground surface 80 and remove a portion of soil 82. The interaction of the gear system 60 and the tine-holder shafts 30 and 40 causes the revolving 28 and rotation 68 motions of the tine-holder shafts 30 and 40, which in turn, causes the desired motion of the individual tines 50. Notably, the direction of rotation 68 and the direction revolution 28 may be different from that depicted in FIGS. 7A–C, depending on a number of factors, such as the type of aeration tine 50 used with the soil aeration apparatus 10. (The operation of the soil aeration tines 50 is described with respect to the embodiment of the soil aeration apparatus 10 and gear system 60 of FIG. 1, but it is understood that the description also applies to other embodiments of the soil aeration apparatus, such as the embodiment shown in FIG. 3.) The gear system 60 is configured to orient the tine 50 at an acute angle to the ground surface 80 when the tine-holder shaft 30 is revolved 28 around the center axis 21 to a point near the ground surface 80.

Referring to FIG. 7A, the soil aeration tine 50 penetrates a patch of soil 82 at an acute angle 84 with respect to the ground surface 80. In this embodiment, one or more soil fracturing surfaces 52 on the tine 50 penetrate the soil at an acute angle, which causes the soil proximate the aeration tine 50 to fracture upward rather than compact. Referring to FIG. 7B, even though the tine-holder shaft 30 continues to revolve 28 around the central axis 21, the soil aeration tine 50 is rotated 68 by the motion of the planetary gear 63 attached to the tine-holder shaft 30. The sweeping action 56 from the revolving 28 and rotational 68 motions forms an aeration pocket 86 in the region penetrated by the soil aeration tine 50. As shown in FIG. 7C, the tine-holder shaft 30 continues to revolve 28 around the central axis 21, which causes the tine 50 to be pulled from the soil 82 even as the tine 50 continues to rotate 68. The removal action 58 from the revolving 28 and rotational 68 motions completes the formation of the aeration pocket 86. In this embodiment, the tine 50 includes a cutting tube 55 that cuts and removes a plug 88 of soil 82 during the sweeping 56 and removal 58 actions. The penetration 54, sweeping 56, and removal 58 actions are repeated as the subsequent tine-holder shaft 40 is revolved 28 near the ground surface 80 and the corresponding planetary gear 64 causes the tines 50 to be oriented at an acute angle to the ground surface 80.

Figure 8:
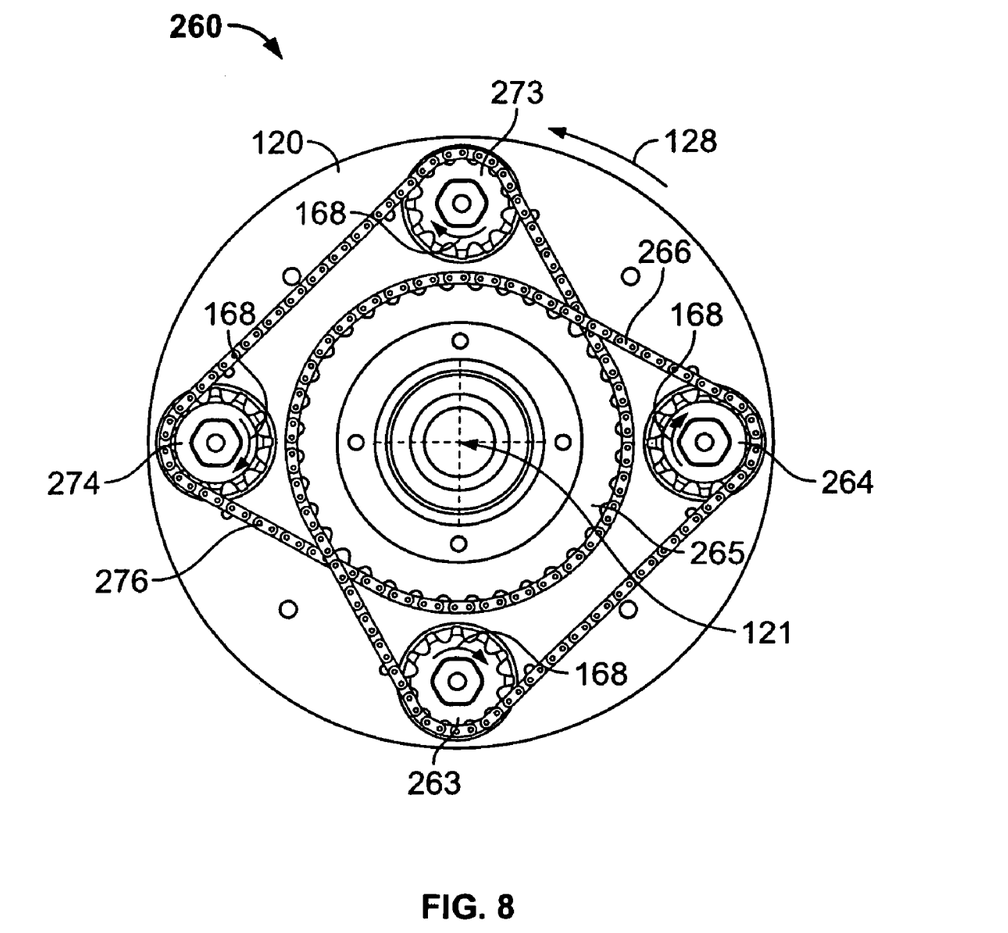
FIG. 8 is a side view of the soil aeration apparatus of FIG. 3 in accordance with another embodiment of the invention.

Various embodiments of the gear system for the soil aeration apparatus 110 may be used to advantageously reduce the bulkiness of the apparatus 110. Referring to FIG. 8, a gear system 260 may be implemented to cause the desired motion of the tine-holder shafts 130, 135, 140, and 145. In this embodiment, sun gear 265 is aligned with the central axis 121 and remains substantially fixed with respect to the central axis 121 even as the carrier 120 rotates about the central axis 121. The sun gear 265 is not necessarily positioned between the planetary gears 263 and 264, yet the gears 263, 264, and 265 are radially aligned so that the drive chain 266 may engage the gears 263, 264, and 265. Similarly, planetary gears 273 and 274 interact with another sun gear (positioned behind the first sun gear 265 and not shown in FIG. 8) that is axially aligned with the central axis 121. Alternatively, the drive chains 266 and 276 may engage the same sun gear 265, depending on the axial thickness of the sun gear 265 and the type of drive chain. As shown in FIG. 8, while the planetary gears 263, 264, 273, and 274 move around the corresponding sun gears in the direction of revolution 128, each planetary gear 263, 264, 273, or 274 is caused to rotate about its own axis in the direction of rotation 168. Because each sun gear is used to operate a plurality of planetary gears (rather than a one-to-one correspondence), the bulkiness of the soil aeration apparatus and gear system may be reduced.

Figure 9:
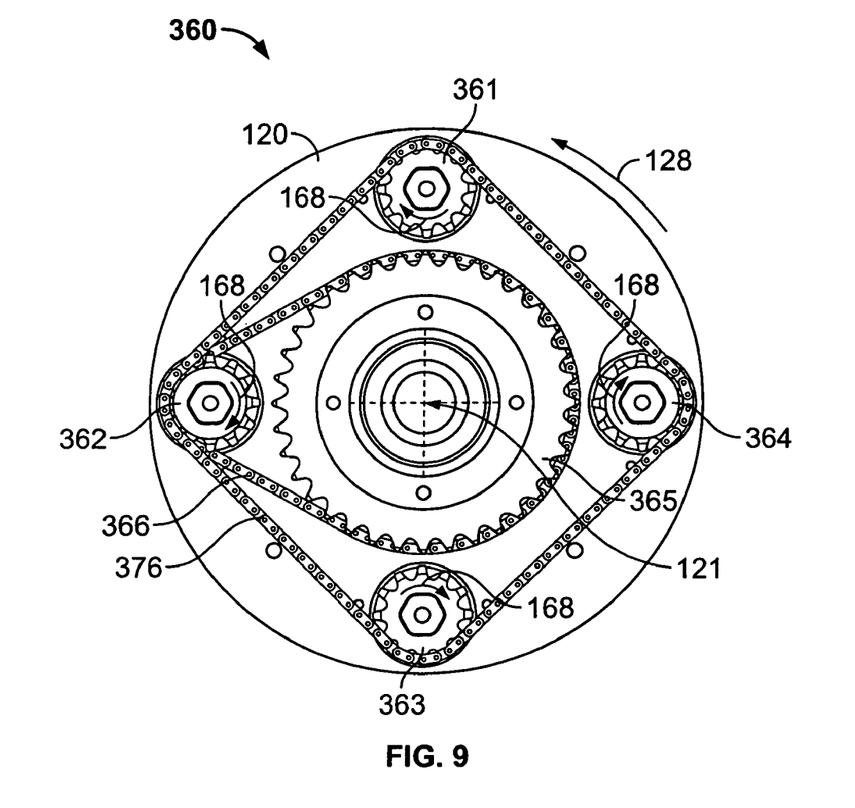
FIG. 9 is a side view of the soil aeration apparatus of FIG. 3 in accordance with yet another embodiment of the invention.

In another embodiment, the gear system may include planetary gears that are indirectly engaged with a sun gear. Referring to FIG. 9, a drive chain 366 engages a first planetary gear 362 and a sun gear 365. A secondary drive chain 376 is engaged with the first planetary gear 362 and other planetary gears 361, 363, and 364, but not with the sun gear 365. The sun gear is axially aligned with the central axis 121 and remains substantially fixed with respect to the central axis 121 even as the carrier 120 rotates about the central axis 121. When the carrier 120 rotates about the central axis 121, the planetary gears 361, 362, 363, and 364 revolve around the sun gear 365 in the direction 128. The drive chain 366 causes the planetary gear 363 to rotate about its own axis in the direction 168. This rotation of planetary gear 362 causes the drive chain 376 to rotate the other planetary gears 361, 363, and 364 in the same rotational direction 168. As such, the more compact gear system 360 drives four planetary gears 361, 362, 363, and 364 using an individual sun gear 365.

Certain embodiments described above show a gear system positioned on the one side of the soil aeration apparatus. Other embodiments, however, may include two gear systems—one gear system positioned on each side of the apparatus. For example, one gear system may be positioned on the outer side of one carrier 20 or 120, and a second gear system (substantially mirrored to the first gear system) may be positioned on the outer side of the opposing carrier 22 or 122.

Figure 10:
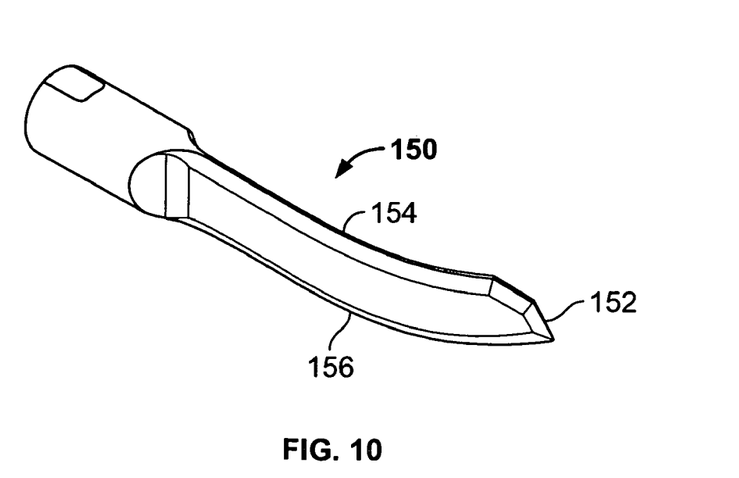
FIG. 10 is a perspective view of an aeration tine that may be used with a soil aeration apparatus in accordance with an embodiment of the invention.

In addition, the soil aeration tines 50 are not limited to the embodiment shown in FIGS. 7A–C. Rather, the tines 50 may various configurations, such as fracturing surfaces, spikes, aeration tubes, aeration blades, or a combination thereof, depending on the soil texture or other factors. Referring to FIG. 10, for example, the tines may include aeration blades 150 that penetrate and cut the soil without necessarily removing a "plug" of soil from the ground. The aeration blade may include a tip 152, a concave edge 154, and a convex edge 156 to penetrate and cut the soil while reducing the amount of soil compaction. As such, the ground surface is not littered with plugs of soil after operation of the soil aeration apparatus.

Furthermore, the direction of rotation 68 or 168 and the direction of revolution 28 or 128 are not limited to the embodiments shown in FIGS. 1, 3, 4, 7A–C, 8, and 9. For example, the tines 50 that comprise soil aeration blades may be operated with the direction of rotation 68 or 168 and/or the direction of revolution 28 or 128 being reversed from what is shown.

Further yet, the gear system may use an engaging member other than a drive chain to engage the gears in the gear system. For example, the engaging member may comprise a cable, belt, linked chain, or the like. Accordingly, the contact surface of the gears may be configured to appropriately engage the selected type of engaging member.

Moreover, the gear system of the soil aeration apparatus may have any number of sun gears, and is not limited to embodiments having one or two sun gears. Accordingly, the gear system may include any number of planetary gears such that each sun gear engages a plurality of planetary gears.

In another embodiment, the soil aeration apparatus may have a non-centrally located support shaft that is positioned concentrically with a tine-holder shaft. In such an embodiment, the tine-holder shaft may be rotatably mounted to the carrier and coupled to a planetary gear while an inner support shaft is fixedly coupled with respect to the opposing carriers. This arrangement of the tine-holder shaft and the non-centrally located support shaft provides support for the soil aeration apparatus. Moreover, because the support shaft is not occupying space outside of the tine-holder shaft, an increased number of tine-holder shafts may be mounted to the carriers. Alternatively, the non-centrally located support shafts may be mounted to the carriers along the outer perimeter of the carriers. For example, in the embodiments where the carriers are circular, the support shafts may be very thin members having a concave surface that matches the curve of the carrier's circumference. This concave surface may be mounted to the carrier along a portion of the circumference such that the non-centrally located support shaft does not occupy a significant amount of area on the opposing faces of the carriers.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for aerating soil, comprising:
    first and second substantially parallel shafts rotatably coupled to a carrier, each shaft having one or more soil aerating tines attached thereto;
    a gear system to rotate each of the first and second shafts while revolving the first and second shafts about a central axis of the carrier, the gear system having a planetary gear coupled to each shaft and a sun gear axially aligned with the central axis,
    wherein the sun gear is engaged with the planetary gears and the sun gear remains substantially rotationally fixed relative to the central axis.

2. The apparatus of claim 1, further comprising a non-centrally located support shaft offset from the central axis and coupled to the carrier.

3. The apparatus of claim 2, wherein the first and second shafts are offset from the central axis such that the tines are operative to move through the central axis without interference from another tine or shaft.

4. The apparatus of claim 1, wherein the gear system comprises:
    a first planetary gear coupled to the first shaft and axially aligned with a first axis of the first shaft;
    a second planetary gear coupled to the second shaft and axially aligned with a second axis of the second shaft;
    the sun gear being radially aligned with the first and second planetary gears; and
    an engaging member engaged with the sun gear, the first planetary gear, and the second planetary gear.

5. The apparatus of claim 4, wherein when the carrier rotates about the central axis:
    the first and second planetary gears are operative to revolve around the sun gear,
    the first planetary gear is operative to rotate about the first axis, and
    the second planetary gear is operative to rotate about the second axis.

6. The apparatus of claim 5, wherein when the carrier rotates about the central axis:
    the first and second shafts are operative to revolve around the central axis,
    the first shaft is operative to rotate about the first axis, and
    the second shaft is operative to rotate about the second axis.

7. The apparatus of claim 6, when the carrier rotates about the central axis, the soil aeration tines are operative to penetrate and remove a portion of soil from a ground surface.

8. The apparatus of claim 4, wherein the engaging member comprises a chain, cable, or belt.

9. The apparatus of claim 1, wherein the soil aerating tines comprise tubes, blades, spikes, or a combination thereof.

10. The apparatus of claim 1, wherein the sun gear is engaged with the planetary gears by a coupling member.

11. The apparatus of claim 10, wherein the coupling member includes a chain, cable, or belt.

12. A soil aerator, comprising:
    a carrier rotatably attached to a frame such that the carrier is rotatable about a central axis;
    first and second shafts rotatably coupled to the carrier such that the first shaft is rotatable about a first axis and the second shaft is rotatable about a second axis, wherein the first axis and second axis are substantially parallel to the central axis, each shaft having one or more soil aerating tines attached thereto; and
    a gear system comprising:
        a first planetary gear coupled to the first shaft and axially aligned with the first axis;
        a second planetary gear coupled to the second shaft axially aligned with the second axis;

a sun gear axially aligned with the central axis and radially aligned with the first and second planetary gears, the sun gear being substantially fixed with respect to the frame; and a coupling member engaged with the sun gear, the first planetary gear, and the second planetary gear.

13. The soil aerator of claim 12, wherein when the carrier rotates about the central axis:

the first and second planetary gears are operative to revolve around the sun gear, the first planetary gear is operative to rotate about the first axis, and the second planetary gear is operative to rotate about the second axis.

14. The soil aerator of claim 13, wherein when the carrier rotates about the central axis:

the first and second shafts are operative to revolve around the central axis, the first shaft is operative to rotate about the first axis, and the second shaft is operative to rotate about the second axis.

15. The soil aerator of claim 14, when the carrier rotates about the central axis, the soil aeration tines are operative to penetrate and remove a portion of soil from a ground surface.

16. The soil aerator of claim 12, wherein the coupling member comprises a chain, cable, or belt.

17. The soil aerator of claim 12, further comprising a non-centrally located support shaft offset from the central axis and coupled to the carrier.

18. The soil aerator of claim 17, wherein the first and second shafts are offset from the central axis such that the tines are operative to move through the central axis without interference from another tine or shaft.

19. The soil aerator of claim 12, wherein the frame comprises at least one wheel and a connection means for releasably attaching the frame to a vehicle.

20. The soil aerator of claim 19, further comprising a drive means engaged with the carrier to cause the carrier to rotate about the central axis.

21. The soil aerator of claim 20, wherein the soil aerating tines comprise tubes, blades, spikes, or a combination thereof.

22. An apparatus for aerating soil, comprising:

a carrier rotatably attached to a frame such that the carrier is rotatable about a central axis;

first and second shafts rotatably coupled to the carrier, each shaft having one or more soil aerating tines attached thereto; and a support member offset from the central axis and coupled to the carrier, wherein the first and second shafts are offset from the central axis such that the tines are operative to move through the central axis without interference from another tine or shaft.

23. The apparatus of claim 22, further comprising a gear system for rotating each of the first and second shafts while revolving the first and second shafts about a central axis of the carrier, the gear system having a planetary gear coupled to each shaft and a sun gear axially aligned with the central axis.

24. The apparatus of claim 23, wherein the sun gear is engaged with the planetary gears.

25. The apparatus of claim 24, further comprising a coupling member to engage each sun gear with the corresponding planetary gears, wherein the coupling member includes a chain, cable, or belt.

* * * * *